United States Patent
Lyons et al.

(10) Patent No.: US 6,722,986 B1
(45) Date of Patent: Apr. 20, 2004

(54) ELECTRONIC CASINO GAMING WITH AUTHENTICATION AND IMPROVED SECURITY

(75) Inventors: Martin Lyons, Alexandria (AU); Robert Linley Muir, Rosebery (AU)

(73) Assignee: Aristocrat Technologies Australia Pty Ltd., Lane Cove (AU)

( * ) Notice: Subject to any disclaimer, the term of this patent is extended or adjusted under 35 U.S.C. 154(b) by 0 days.

(21) Appl. No.: 09/857,040

(22) PCT Filed: Nov. 26, 1999

(86) PCT No.: PCT/AU99/01056

§ 371 (c)(1), (2), (4) Date: Oct. 5, 2001

(87) PCT Pub. No.: WO00/33196

PCT Pub. Date: Jun. 8, 2000

(30) Foreign Application Priority Data

Nov. 26, 1998 (AU) .............................................. PP7342

(51) Int. Cl.[7] ................................................. G06F 5/00
(52) U.S. Cl. ............................ 463/29; 713/168; 713/176
(58) Field of Search ............................ 463/29; 713/184, 713/169, 170, 171, 193, 194, 182, 177, 176, 168, 161, 200

(56) References Cited

U.S. PATENT DOCUMENTS

| | | | | |
|---|---|---|---|---|
| 5,004,232 A | * | 4/1991 | Wong et al. .................. | 463/29 |
| 5,259,626 A | * | 11/1993 | Ho .............................. | 463/37 |
| 5,326,104 A | * | 7/1994 | Pease et al. .................. | 463/18 |
| 5,421,006 A | * | 5/1995 | Jablon et al. ................. | 714/36 |
| 5,489,095 A | * | 2/1996 | Goudard et al. ............. | 713/194 |
| 5,638,447 A | * | 6/1997 | Micali ......................... | 713/180 |
| 5,643,086 A | * | 7/1997 | Alcorn et al. ................. | 463/29 |
| 5,721,781 A | * | 2/1998 | Deo et al. ..................... | 705/67 |
| 5,778,070 A | * | 7/1998 | Mattison ..................... | 713/191 |
| 5,860,099 A | * | 1/1999 | Milios et al. ............... | 711/103 |
| 6,106,396 A | * | 8/2000 | Alcorn et al. ................. | 463/29 |
| 6,149,522 A | * | 11/2000 | Alcorn et al. ................. | 463/29 |
| 6,301,658 B1 | * | 10/2001 | Koehler ...................... | 713/155 |
| 6,490,491 B1 | * | 12/2002 | Hartmann et al. ........... | 700/86 |
| 6,595,856 B1 | * | 7/2003 | Ginsburg et al. ............. | 463/29 |

FOREIGN PATENT DOCUMENTS

| | | | |
|---|---|---|---|
| JP | 08-59023 | * | 9/1997 |
| JP | 11288198 | * | 4/2001 |

* cited by examiner

Primary Examiner—Teresa Walberg
Assistant Examiner—Y Cherubin
(74) Attorney, Agent, or Firm—Katten Muchin Zavis Rosenman

(57) ABSTRACT

A gaming machine is described in which all interested parties to a game program to run on the gaming machine, will digitally sign each piece of approved program prior to installation. These signatures are stored with the program on a mass storage device inside the gaming machine. When the machine needs to load a piece of program, or upon an external command after a significant event such as a jackpot payout, it will execute the SHA-1 program code in the EPROM on the program being loaded, and then perform a DSA verification operation using the SHA-1 output as one of the parameters. The DSA verification operation will be repeated for every digital signature stored with the program, and all must be valid, so that it is impossible to execute program code that has not been approved by the manufacturer, the jurisdictional authority and optionally the casino and/or other parties.

78 Claims, 5 Drawing Sheets

ELECTRONIC CASINO GAMING WITH AUTHENTICATION AND IMPROVED SECURITY

INTRODUCTION

The present invention relates generally to electronic gaming machines or consoles and in particular the invention provides an improved system for executing casino games in RAM as opposed to the conventional unalterable ROM. The improvements provide an authentication process based upon digital signatures, with the U.S. Digital Signature Standard (DSS) being the preferred means of implementation.

For the sake of clarity the following terms are defined for the purpose of this specification.

A gambling machine, usually referred to as a gaming machine, is a traditional gaming machine. Typical examples include slot machines of the type made by Aristocrat Leisure Industries or IGT.

A casino refers to the operator of gambling machines.

A digital signature is a pair of large numbers represented in a computer as strings of binary digits. The digital signature is computed using a set of rules (i.e., the DSA) and a set of parameters such that the identity of the signatory and integrity of the data can be verified.

Strong encryption is the encryption of data such that it is computationally infeasible for a third party—for example a government agency—to retrieve the encrypted data without a key.

A hash, or message digest, is the output from a function that produces a value that is unique for any message input into it. A one-way hash produces an output that is computationally difficult to relate to the input. It is also computationally difficult to produce two different messages with the same message digest.

An unforgeable log is produced by chaining together hash values such that the nth entry in the log is dependent on the (n−1)'h entry, and thus previous entries cannot be altered without re-computing the whole chain.

A logic cage is a secure area inside the gaming machine that cannot be accessed without sufficient security clearance.

REFERENCES

"The Digital Signature Standard" U.S. Federal Information Processing Standards Publication 186

"The Secure Hash Standard" U.S. Federal Information Processing Standards Publication 180-1

"Cryptographic Support for Secure Logs on Untrusted Machines" by Bruce Schneier and John Kelsey (available at http://www.counterpane.com/secure-logs. html)

BACKGROUND OF THE INVENTION

Traditionally, microprocessor based gaming machines store their program contents in unalterable ROM or EPROM. During installation and after a large jackpot payout, the machine is physically inspected and the EPROMs are removed. These EPROMs are placed in a verification device which produces an output string using a known algorithm usually referred to as a hash function. This string is compared against a string that has been already generated when the game program was approved by the gaming jurisdiction. Authentication is achieved by a match of the approved string and the EPROM generated string.

The main disadvantage of such a system is that the current limited capacity of EPROM technology ensures that games cannot be as sophisticated as if they were stored in an alternative medium such as a hard disk or CD-ROM. The other problem with using RAM is that it cannot be extracted and placed in a verification device, since the contents of the RAM are necessarily volatile.

Another system, disclosed and described in U.S. Pat. No. 5,643,086 uses a private key to encrypt a message digest of the approved copy of the program, and thus produce an unalterable digital signature which can be decrypted with a corresponding public key and compared against a message digest generated by an unalterable EPROM in the gaming machine.

The disadvantage of the above invention is that it relies on strong encryption, currently subject to export restrictions from the U.S. and other countries. This program can only be signed by one party and if a single private key is compromised, the whole system is compromised.

A related problem that exists is that of version control. Once a gaming machine program is found to be faulty, a modification or 'patch' is usually distributed. Unfortunately, conventional EPROM based machines, and the disclosed system above, have no method implemented of ensuring that the earlier version of the program is not re-installed, either deliberately or by accident, later. Once program is approved, it is impossible for the machine to revoke that approval. If a rogue element was able to 'sneak past' a jurisdiction a dubious piece of program, there would be no way to stop it being used in a casino, even after detection

SUMMARY OF THE INVENTION

The invention provides a gaming machine with enhanced capability for storing games due to enhanced security and authentication capabilities.

According to a first aspect the present invention provides a programmable controller, including a readable and writable storage means to hold a program during its execution by the programmable controller, and program authentication means comprising digital signature verification means which verifies a digital signature associated with the program and prevents execution of the program if the digital signature is not valid.

According to a second aspect the present invention provides a method of verifying a program or a program component for a programmable controller, including a readable and writable storage means to hold a program during its execution by the programmable controller, and program authentication means comprising digital signature verification means which verifies a digital signature associated with the program, and the method including a step of verifying the digital signature against a key, and preventing execution of the program if the digital signature is not valid.

Preferably, the digital signature is generated by a method that does not include encryption such that de-encryption is not performed during the digital signature verification.

According to a third aspect the present invention provides a programmable controller, including a readable and writable storage means to hold a program during its execution by the programmable controller, and program authentication means comprising digital signature verification means which verifies each of a plurality of digital signatures associated with the program and prevents execution of the program if any one of the digital signatures is not valid.

According to a fourth aspect the present invention provides a method of verifying a program or a program component for a programmable controller, including a readable and writable storage means to hold a program during its execution by the programmable controller, and program authentication means comprising digital signature verification means which verifies each of a plurality of digital signatures associated with the program, and the method including steps of verifying each of the digital signatures against a respective key, and preventing execution of the program if any one of the digital signatures is not valid.

Preferably the or each digital signature is generated by a method that does not include encryption such that de-encryption is not performed during the digital signature verification.

In one embodiment, the programmable controller is used to control the operation of a game played on an electronic gaming machine and the signed program is a game program or a component of a game program.

Preferably multiple signatures may be applied to the game program, to ensure that only program approved by not only the manufacturer, but also the jurisdictional authority and optionally the casino itself, is executed by the machine Preferably also a system is provided for revoking signature keys. This can be password based—a password is entered which allows one of the public signatures stored in the machine to be changed. Alternatively, a revocation certificate can be used, which must be valid, or the revocation system can be time based, where the machine stores a set of signatures, good for say 10 years, and the current active signature is based upon the current system clock.

A system of equivalent signatures is also preferably provided, such that any one of these signatures can be used as part of the verification. Ideally a manufacturer will have at least one signature for its office in each jurisdiction. Any one could be used to sign a game, but it would be apparent in the event of a problem where the responsibility would lie, and could be revoked easily.

Preferably a system for version control is also included, such that once a later version of program runs on a gaming machine it is then impossible to run an earlier version of the same program. This would preferably permanently revoke faulty games once a fix had been issued.

Preferably any signature and version changes are held in secure unforgeable logs updated after each change to help detect possible fraud. Preferably also the unforgeable logs are implemented using tamper-proof devices such as smartcards to ensure that the log can never be deleted.

BRIEF DESCRIPTION OF THE DRAWINGS

Embodiments of the present invention will now be described by way of example with reference to the accompanying drawings in which.

DETAILED DESCRIPTION OF THE PREFERRED EMBODIMENTS

In the following detailed description the methodology of the embodiments will be described, and it is to be understood that it is within the capabilities of the non-inventive worker in the art to introduce the methodology on any standard microprocessor-based gaming machine or gaming console by means of appropriate programming.

Figure 1:
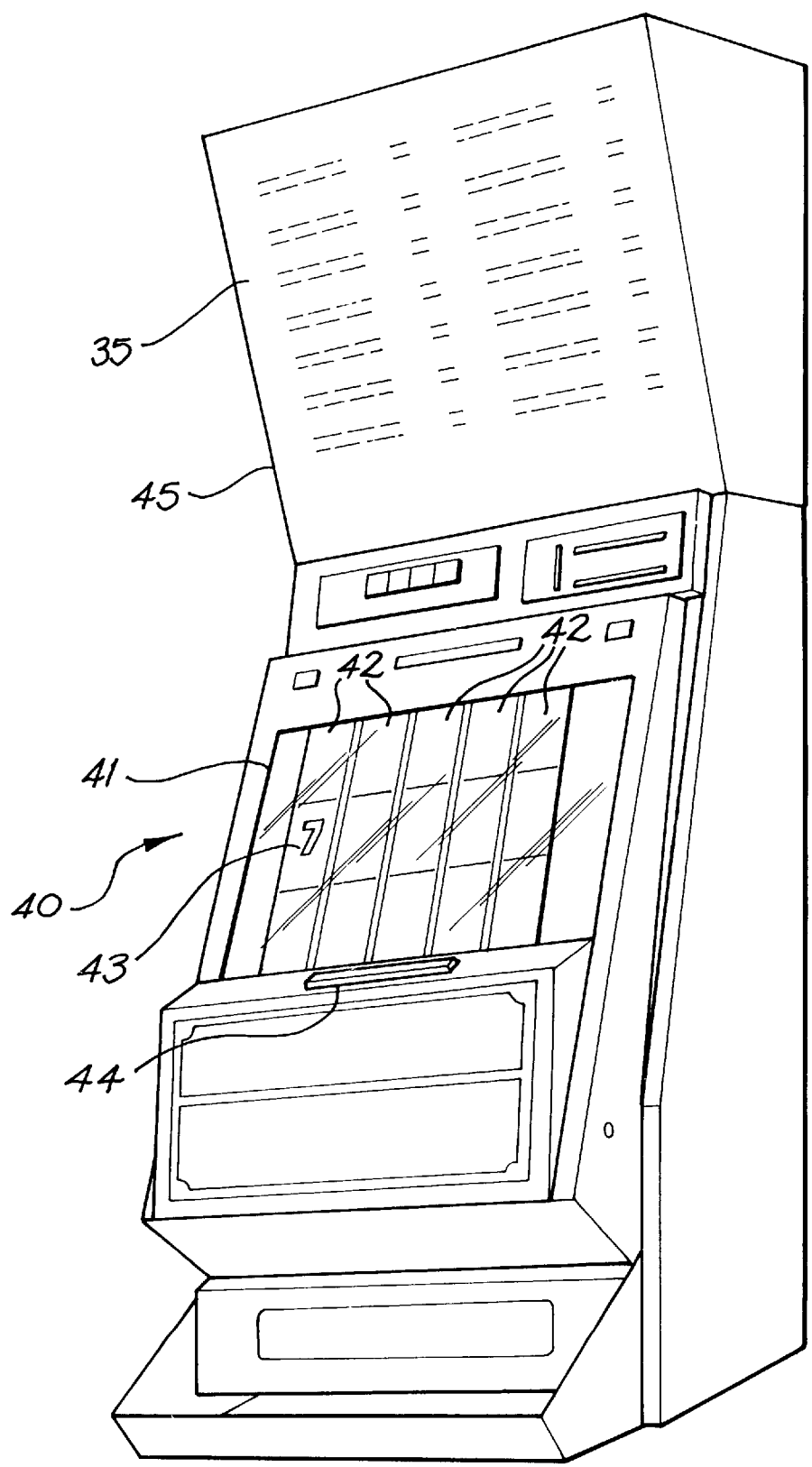
FIG. 1 illustrates a conventional gaming machine in which the present invention may be implemented.

Referring to FIG. 1 of the drawings, the first embodiment of the invention is illustrated in which a slot machine 40, of the type having a video display screen 41 which displays a plurality of rotatable reels 42 carrying symbols 43, is arranged to pay a prize on the occurrence of a predetermined symbol or combination of symbols.

In the slot machine 40 illustrated in FIG. 1, the game is initiated by a push button 44, however, it will be recognized by persons skilled in the art that this operating mechanism might be replaced by a pull handle or other type of actuator in other embodiments of the invention. The top box 45 on top of the slot machine 40 carries the artwork panel 35 which displays the various winning combinations for which a prize is paid on this machine.

Figure 2:
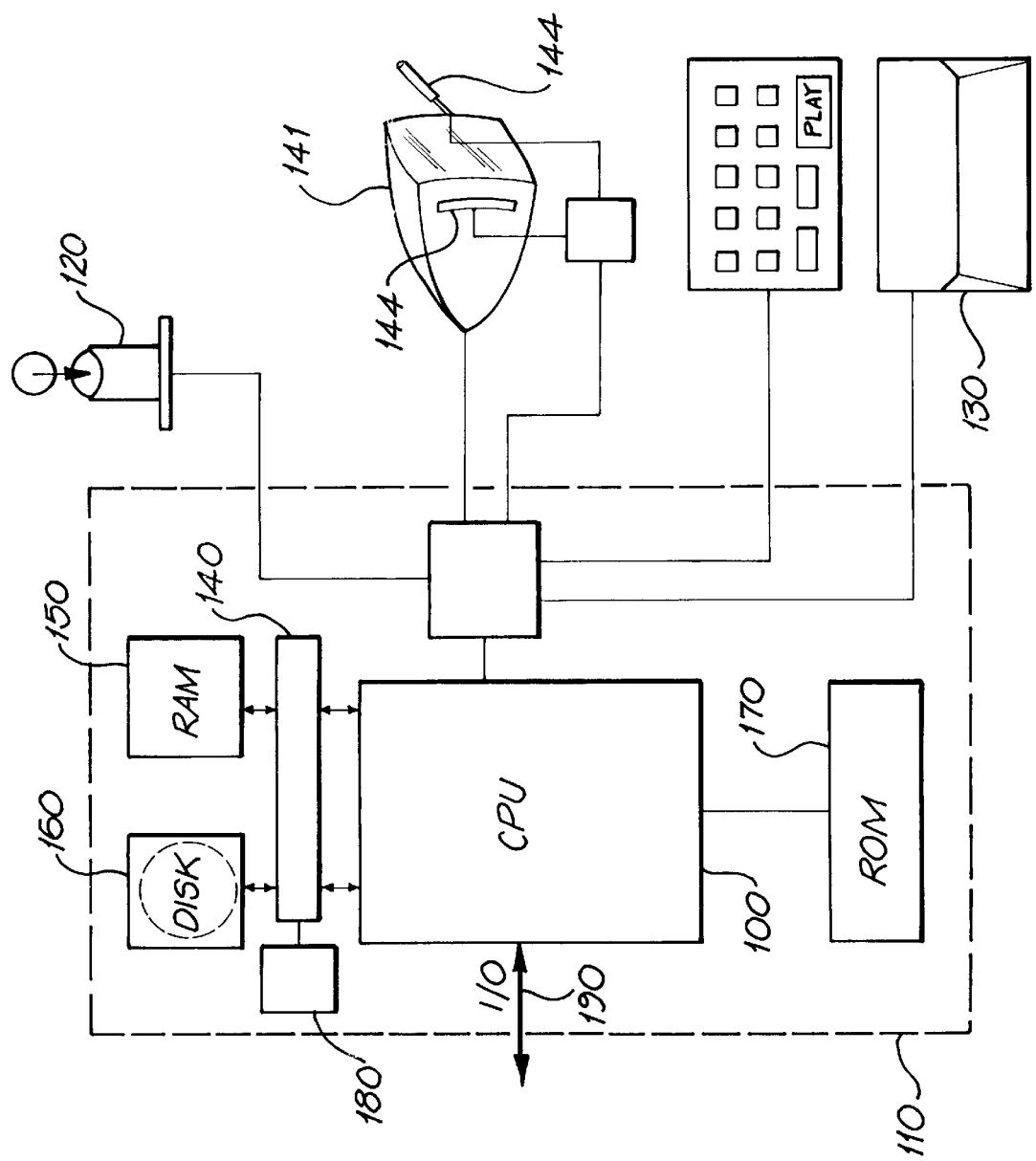
FIG. 2 is a block diagram of a control unit according to the present invention.

The program which implements the game and user interface is run on a standard gaming machine control processor 100 as illustrated schematically in FIG. 2. This processor forms part of a controller 110 which drives the video display screen 141 and receives input signals from sensors 144. The sensors 144 may be touch sensors, however, in alternative embodiments these may be replaced by a pull handle or another type of actuator such as button 44 in FIG. 1. The controller 110 also receives input pulses from a mechanism 120 indicating the user has provided sufficient credit to begin playing. The mechanism 120 may be a coin input chute, a bank note acceptor (bill acceptor), a credit card reader, or other type of validation device. The controller 120 also drives a payout mechanism 130 which for example may be a coin output.

The controller 110 also includes ROM 170 in which fixed and secure program components are held. This ROM may also contain part or all of a program to perform a program verification function for programs running on the CPU 100 out of RAM 150 or loaded onto or from the disk 160.

Alternatively, the program verification may be performed by a stand alone verification system 140 interposed between the RAM 150, the disk 160 and the CPU 100. The verification system may make use of a tamper proof storage element such as a smart card 180 (or a device containing a smart card chip, or the verification system 140 may itself be implemented as a smart card or smart card chip in which case, it will not require the separate smart card 180. An Input/Output function 190 is also provided for the CPU to communicate with a gaming machine network for administration participation in system wide prizes and bonuses and for downloading of game programs.

The game played on the machine shown in FIGS. 1 and 2 is a relatively standard game which includes a 3 by 5 symbol display and allows multiple pay lines.

Slot machines such as those of the type described with reference to FIGS. 1 and 2 can be adapted to embody the present invention with generally only a program change to modify the functions of some of the user interfaces of the machine.

The system, when built will consist of an electronic gaming machine, with standard features such as graphics capability, a monitor, sound output and interfaces to gaming hardware such as hoppers, bill acceptors etc. The gaming machine would also have a sophisticated central processor, say a Pentium or PowerPC for example, with a large amount of RAM, a storage device such as a hard disk, CD-ROM or remote network storage and optionally a smartcard interface.

The machine would furthermore have an unalterable EPROM which would have stored in it program code to perform the DSS algorithm, also know as the DSA. It would also contain code to perform the Secure Hash Algorithm (SHA-1), the designated U.S. Federal standard message digest algorithm. This EPROM would be able to be extracted and inspected by the traditional means. In alternative implementations, other digital signature algorithms could be used such as GOST, ESIGN or even the previously disclosed RSA method which requires encryption.

Figure 3:
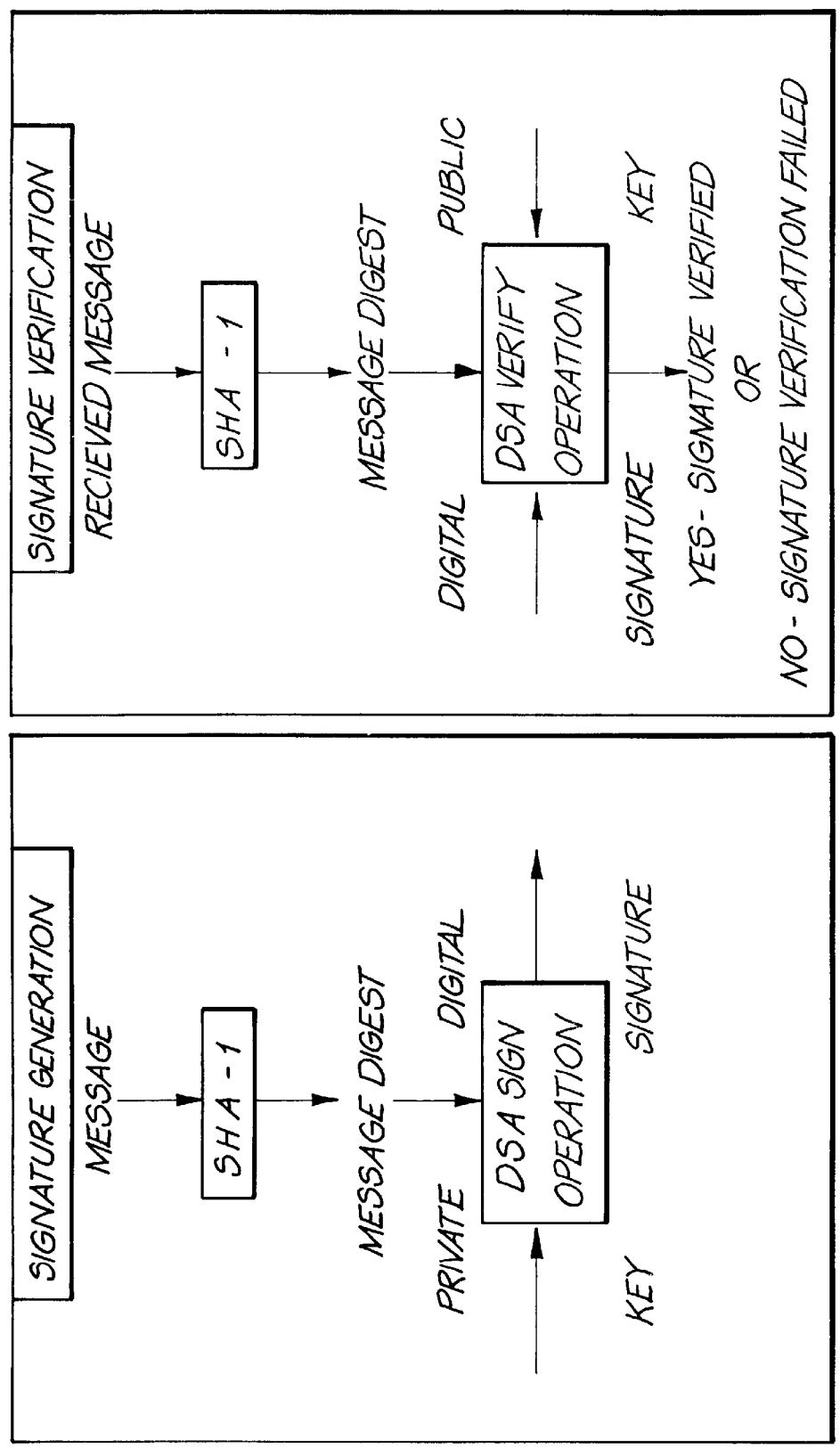
FIG. 3 is a diagrammatic representation of a method of signature generation and verification according to the present invention.

FIG. 3, copied from the U.S. Federal standard FIPS 180-1, describes the operations that produce and verify a digital signature using DSA and SHA-1. An important distinguishing characteristic of this system is that it does not use encryption to produce a digital signature. It is thus not subject to export restrictions from the US and other countries.

Figure 4:
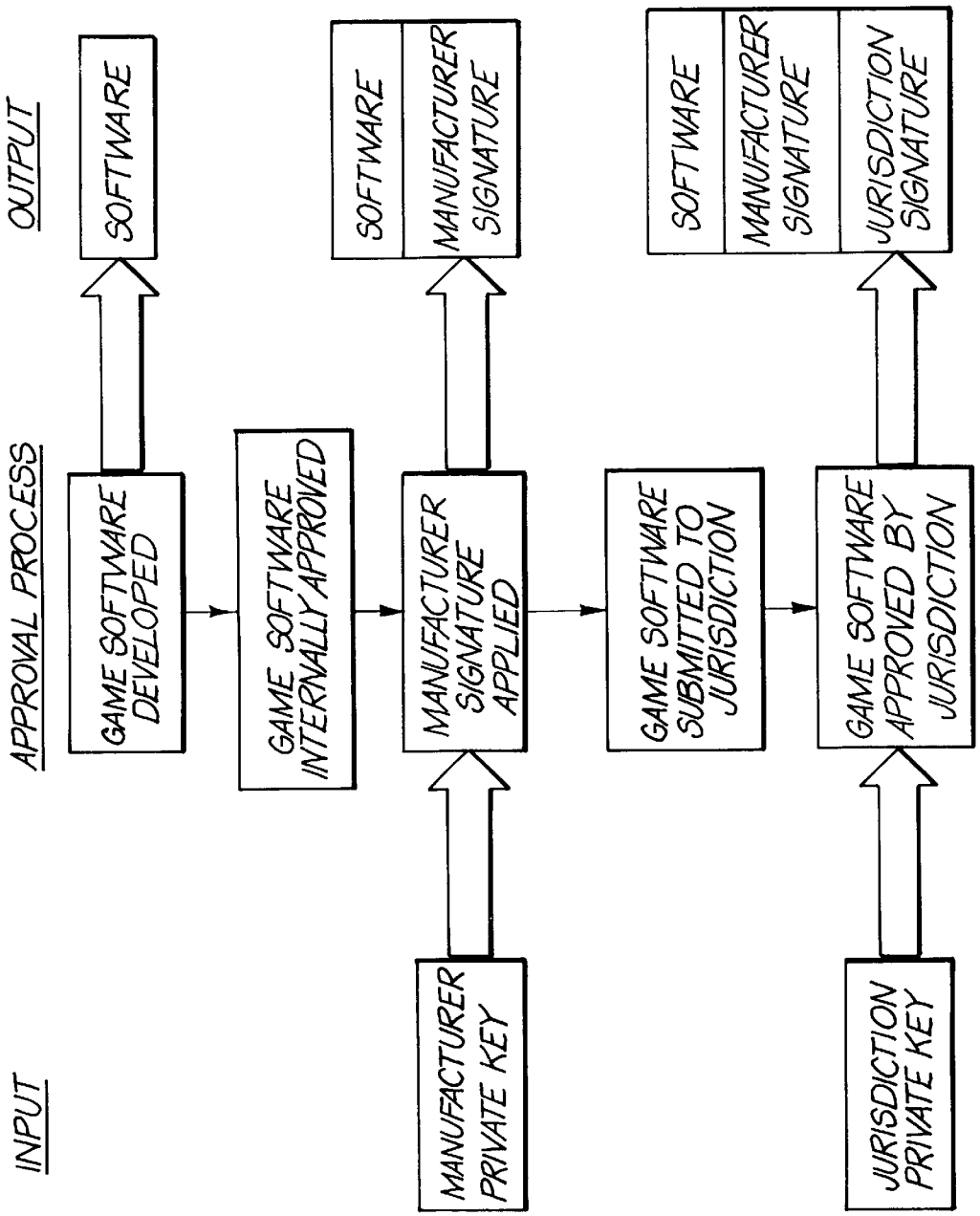
FIG. 4 is a flow diagram of a program approval process according to the present invention.

Each set of program that is to be installed in any gaming machine at present must be approved, both by the gaming jurisdictional authority and by the machine manufacturer. It also may need to be approved by the casino in which the machine will reside. In the preferred implementation, all interested parties will digitally sign each piece of approved program prior to installation. The process of game program being produced, approved and authenticated would proceed as in FIG. 4.

Figure 5:
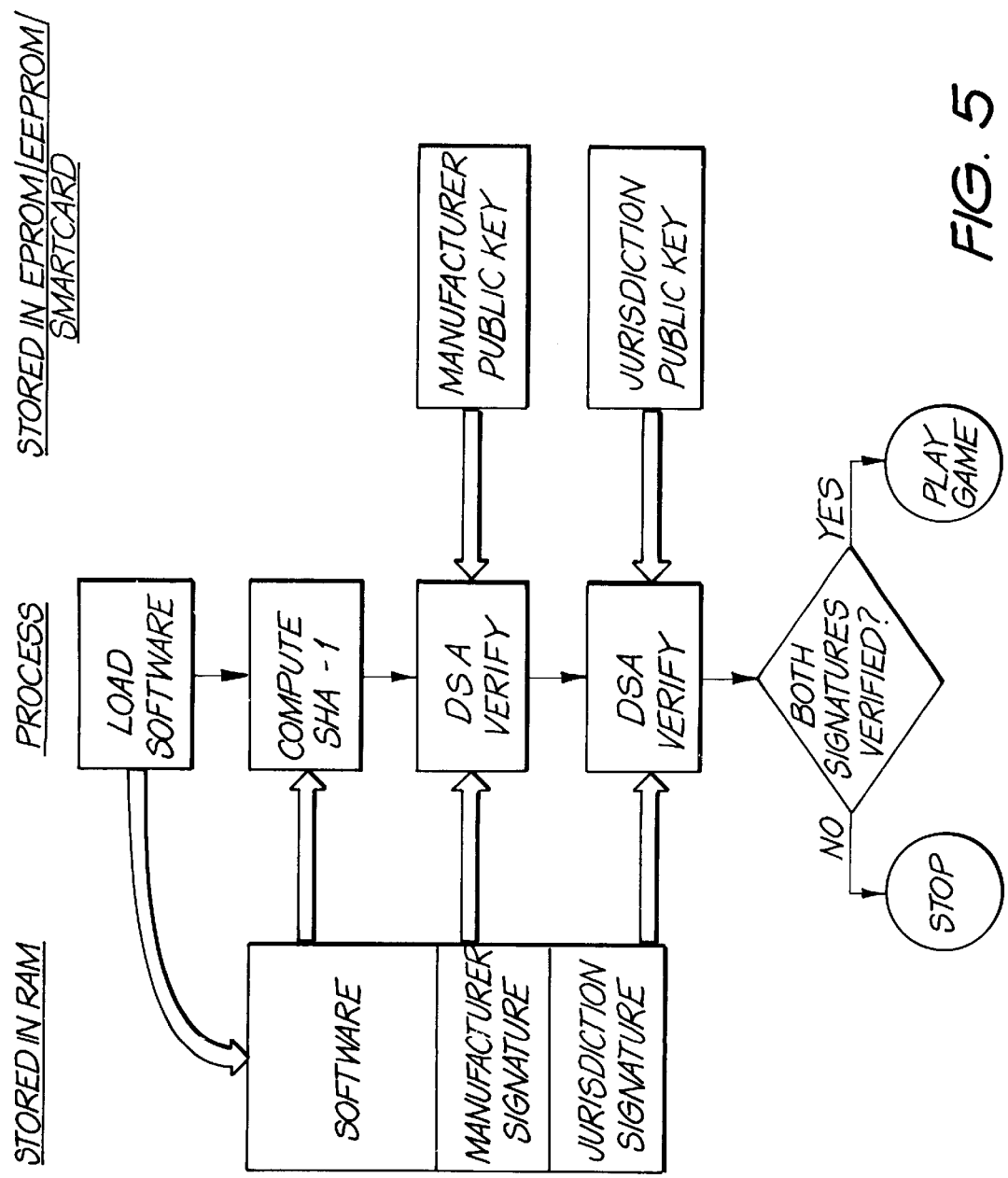
FIG. 5 is a flow diagram illustrating a method of executing approved program according to the present invention.

These signatures will be stored with the program on a mass storage device inside the gaming machine. When the machine needs to load a piece of program, or upon an external command after a significant event such as a jackpot payout, it will execute the SHA-1 program code in the EPROM on the program being loaded, and then perform a DSA verification operation using the SHA-1 output as one of the parameters. The DSA verification operation will be repeated for every digital signature stored with the program, and all must be valid, so that it is impossible to execute program code that has not been approved by the manufacturer, the jurisdictional authority and optionally the casino and/or other parties. The process of executing pre-approved program would proceed as in FIG. 5.

A significant benefit of multiple signatures, as opposed to other disclosed systems which use only one, is that it protects all parties from a rogue element working within either the manufacturer, the jurisdiction or the casino. To successfully install a fraudulent piece of program in a gaming machine that uses this system would require a concerted conspiracy involving trusted personnel working for all parties.

To perform the digital signature verification, it is also necessary that the machine store public keys for the appropriate parties—jurisdiction, casino and manufacturer. In the preferred implementation, these keys are stored in EEPROM, which can be modified at suitable times by a program stored in the EPROM, under strict security conditions. This enables signatures to be revoked if compromised, or periodically updated. In an alternative implementation, a plurality of signature public keys are stored in the unalterable EPROM and variables stored in EEPROM indicate which of these signatures are active. In another alternative implementation, a tamper-proof device such as a smartcard stores the public keys. The program code in the EPROM passes the output from the SHA-1 algorithm to the smartcard along with the signature values stored with the program. The smartcard then performs the DSS or other signature verification and returns either an authentication or denial code to the gaming machine. Once revoked, the smartcard will not allow keys to be re-enabled.

Since it will be possible to change the digital signatures that authenticate program running in the machine, it is important that an unforgeable log is kept of all program changes or signature changes. This can be achieved by the use of a hash chain, where every entry in the log is 'hashed' with the previous log entry's hash value. In a preferred implementation, this hash chain, or the most recent part of it, is stored within a tamper-proof device such as a smartcard or the traditionally used logic cage. A smartcard is preferred, since it can have a secret, unique identification code, and is thus non-reproducible and unforgeable itself. Program code stored in the unalterable EPROM accesses the smartcard during signature or program update. Since the latest hash value would always be stored on the smartcard, it would be impossible to change the program without creating a log entry. This would ensure that all modifications to the program stored on the machine was accurately logged which L would be extremely useful in the event of a major jackpot payout. The EPROM can be proven to be unaltered by I the conventional means of placing it in a verification device.

A more detailed description of a possible implementation of a hash-chain unforgeable log can be found in the paper "Cryptographic Support for Secure Logs on Untrusted Machines"—see references above.

Each signature for a file would be linked to the file, but need not be contained within the file. In the event of a signature key revocation, new signatures may have to be downloaded from a network device or using the machine's operator mode. In this case the new signatures being downloaded would indicate which file they are to attach to, and which signature they replace. This would be more economical than re-downloading the whole program set upon a signature key change.

In an alternative implementation, multiple public keys for each corresponding signature are stored. At any one time, only one for each interested party would be active. The schedule for selecting which public keys are active could be time-based, so signatures would in effect have a lifetime. Periodically, the machine would have to be updated with the new signatures as either a maintenance task or upon the payments of an additional license fee to the manufacturer or jurisdiction.

In the event of an authentication failure due to signatures (and therefore the license to run the program) expiring, it could be implemented that the casino would have a 'grace' period to obtain new keys before the machine completely refused to run the program. For example, the machine could display a notice, similar to that found on computer shareware products, informing of the license expiry that would have to be manually accepted by the machine operator every time the machine was reset.

In the alternative implementation, it would also be possible to have multiple signatures active for each party at any one time. One possibility would be that these would correspond to different divisions within the manufacturer or jurisdiction. This would aid tracing in the event of a program or security failure.

Another security aspect that will be implemented in the gaming machine is the concept of version control. Each digitally signed piece of program stored on the mass storage device within the machine will have an associated identification code and version number. It will be impossible to download program with a corresponding identification code and an earlier version number.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A programmable controller, including a readable and writable storage means to hold a program during its execution by the programmable controller, and program authentication means comprising digital signature verification means which verifies a digital signature associated with the program and prevents execution of the program if the digital signature is not valid, the digital signature being generated by a method that does not include encryption such that de-encryption is not performed during the digital signature verification.

2. The controller as claimed in claim 1, wherein a plurality of signatures are applied to the program.

3. The controller as claimed in claim 2, wherein each of the equivalent signatures is identifiable as being associated with a person or entity responsible for issuing or authorizing the program.

4. The controller as claimed in claim 1, wherein the signature verification means stores one or more public signature keys in secure storage and uses a public signature key from the secure storage to verify the digital signature associated with the program.

5. The controller as claimed in claim 4, wherein the signature verification means includes signature revocation means for removing public signature keys from a set of valid keys as a method of revoking signature keys.

6. The controller as claimed in claim 5, wherein the signature revocation means is activated by a password such that when the password is entered it allows a particular public signature stored in the verification means to be changed or deleted.

7. The controller as claimed in claim 5, wherein a digital revocation certificate can be used, which must be validated by the validation means before it causes a public signature key to be revoked.

8. The controller as claimed in claim 5, wherein revocation is time based, whereby the machine stores a set of public signature keys, which are valid for a fixed period of time, after which they are automatically revoked.

9. The controller as claimed in claim 8, wherein the fixed period before automatic revocation is a period of 10 years.

10. The controller as claimed in claim 8, wherein identification of a current active public signature is based upon comparison of a time stamp embedded in the signature with a time and date obtained from a current time value from a system clock.

11. The controller as claimed in claim 4, wherein a plurality of equivalent signatures are provided in the secure storage, such that any one of the equivalent signatures can be used as part of the verification authorization.

12. The controller as claimed in claim 11, wherein each of the equivalent signatures is identifiable as being associated with a person or entity responsible for issuing or authorizing the program.

13. The controller as claimed in claim 1, wherein the programmable controller is used to control the operation of a game played on an electronic gaming machine and the program with which the digital signature is associated is a game program or a component of a game program.

14. The electronic gaming machine as claimed in claim 13, wherein the digital signature is applied to the program by or on behalf of a manufacturer of the electronic gaming machine.

15. The controller as claimed in claim 13, wherein the digital signature is applied to the program by or on behalf of a jurisdictional authority that has jurisdiction to authorize use of the game in a location in which the game is installed.

16. The controller as claimed in claim 13, wherein the digital signature is applied to the program by or on behalf of a casino in which the electronic gaming machine is installed.

17. The controller as claimed in claim 1, wherein the signature verification means stores one or more public signature keys in secure storage and uses a public signature key from the secure storage to verify the digital signature associated with the program.

18. The controller as claimed in claim 17, wherein the signature verification means includes signature revocation means for removing public signature keys from a set of valid keys as a method of revoking signature keys.

19. The controller as claimed in claim 18, wherein the signature revocation means is activated by a password such that when the password is entered it allows a particular public signature stored in the verification means to be changed or deleted.

20. The controller as claimed in claim 18, wherein a digital revocation certificate can be used, which must be validated by the validation means before it causes a public signature key to be revoked.

21. The controller as claimed in claim 18, wherein revocation is time based, whereby the machine stores a set of public signature keys, which are valid for a fixed period of time, after which they are automatically revoked.

22. The controller as claimed in claim 21, wherein the fixed period before automatic revocation is a period of 10 years.

23. The controller as claimed in claim 21, wherein identification of a current active public signature is based upon comparison of a time stamp embedded in the signature with a time and date obtained from a current time value from a system clock.

24. The controller as claimed in claim 17, wherein a plurality of equivalent signatures are provided in the secure storage, such that any one of the equivalent signatures can be used as part of the verification authorization.

25. The controller as claimed in any one of claim 1, wherein the verification program records versions of a program that have been verified and will not re-verify versions earlier than the latest version that it has already verified.

26. The controller as claimed in claim 25, wherein the record of verified program versions is stored in a secure log and entries in the record are unforgable and unalterable after being written.

27. The controller as claimed in claim 26, wherein a record of digital signature key updates is kept in the secure log.

28. The controller as claimed in claim 26, wherein the secure log is recorded in a tamper proof device.

29. The controller as claimed in claim 28, wherein the tamper proof device is a smartcard or contains a smartcard chip.

30. A programmable controller, including a readable and writable storage means to hold a program during its execution by the programmable controller, and program authentication means comprising digital signature verification means which verifies each of a plurality of digital signatures associated with the program and prevents execution of the program if any one of the digital signatures is not valid.

31. The controller as claimed in claim 30, wherein the programmable controller is used to control the operation of a game played on an electronic gaming machine and the program with which the digital signature is associated is a game program or a component of a game program.

32. The controller as claimed in claim 2, wherein one of the digital signatures is applied to the program by or on behalf of a manufacturer of the electronic gaming machine.

33. The controller as claimed in claim 2, wherein one of the digital signatures is applied to the program by or on behalf of a jurisdictional authority that has jurisdiction to authorize use of the game in a location in which the game is installed.

34. The controller as claimed in claim 2, wherein one of the digital signatures is applied to the program by or on behalf of a casino in which the electronic gaming machine is installed.

35. The controller as claimed in any one of claim 30, wherein the verification program records versions of a program that have been verified and will not re-verify versions earlier than the latest version that it has already verified.

36. The controller as claimed in claim 35, wherein the record of verified program versions is stored in a secure log and entries in the record are unforgable and unalterable after being written.

37. The controller as claimed in claim 36, wherein a record of digital signature key updates is kept in the secure log.

38. The controller as claimed in claim 36, wherein the secure log is recorded in a tamper proof device.

39. The controller as claimed in claim 38, wherein the tamper proof device is a smartcard or contains a smartcard chip.

40. A method of verifying a program or a program component for a programmable controller, including a readable and writable storage means to hold a program during its execution by the programmable controller, and program authentication means comprising digital signature verification means which verifies a digital signature associated with the program, the digital signature being generated by a method that does not include encryption and the method including a step of verifying the digital signature against a key, in which de-encryption is not performed during the digital signature verification, and preventing execution of the program if the digital signature is not valid.

41. The method as claimed in claim 40, a plurality of signatures are applied to the program.

42. The method as claimed in claims 40, wherein the programmable controller is used to control the operation of a game played on an electronic gaming machine and the program with which the digital signature is associated is a game program or a component of a game program.

43. The method as claimed in claim 42, wherein one of the digital signatures is applied to the program by or on behalf of a manufacturer of the electronic gaming machine.

44. The method as claimed in claim 42, by or on behalf of a jurisdictional authority that has jurisdiction to authorize use of the game in a location in which the game is installed.

45. The method as claimed in claim 42, wherein one of the digital signatures is applied to the program by or on behalf of a casino in which the electronic gaming machine is installed.

46. The method as claimed in claim 40, wherein the signature verification means stores one or more public signature keys in secure storage and uses a public signature key from the secure storage to verify the digital signature associated with the program.

47. The method as claimed in claim 46, wherein the signature verification means includes signature revocation means for removing public signature keys from a set of valid keys as a method of revoking signature keys.

48. The method as claimed in claim 47, wherein the signature revocation means is activated by a password such that when the password is entered it allows a particular public signature stored in the verification means to be changed or deleted.

49. The method as claimed in claim 47, wherein a digital revocation certificate can be used, which must be validated by the validation means before it causes a public signature key to be revoked.

50. The method as claimed in claim 47, wherein revocation is time based, whereby the machine stores a set of public signature keys, which are valid for a fixed period of time, after which they are automatically revoked.

51. The method as claimed in claim 50, wherein the fixed period before automatic revocation is a period of 10 years.

52. The method as claimed in claim 50, wherein identification of a current active public signature is based upon comparison of a time stamp embedded in the signature with a time and date obtained from a current time value from a system clock.

53. The method as claimed in any one of claims 46; wherein a plurality of equivalent signatures are provided in the secure storage, such that any one of the equivalent signatures can be used as part of the verification.

54. The method as claimed in claim 53, wherein each of the equivalent signatures is identifiable as being associated with a person or entity responsible for issuing or authorizing the program.

55. The method as claimed in any one of claims 40, wherein the verification program records versions of a program that have been verified and will not re-verify versions earlier than the latest version that it has already verified.

56. The method as claimed in claim 55, wherein the record of verified program versions is stored in a secure log and entries in the record are unforgable and unalterable after being written.

57. The method as claimed in claim 56, wherein a record of digital signature key updates is kept in the secure log.

58. The method as claimed in claim 57, wherein the tamper proof device is a smartcard or contains a smartcard chip.

59. The method as claimed in claim 56, wherein the secure log is recorded in a tamper proof device.

60. A method of verifying a program or a program component for a programmable controller, including a readable and writable storage means to hold a program during its execution by the programmable controller, and program authentication means comprising digital signature verification means which verifies each of a plurality of digital signatures associated with the program, and the method including steps of verifying each of the digital signatures against a respective key, and preventing execution of the program if any one of the digital signatures is not valid.

61. The method as claimed in claim 60, wherein the programmable controller is used to control the operation of a game played on an electronic gaming machine and the program with which the digital signature is associated is a game program or a component of a game program.

62. The method as claimed in claim 61, wherein one of the digital signatures is applied to the program by or on behalf of a manufacturer of the electronic gaming machine.

63. The method as claimed in claim 61, wherein one of the digital signatures is applied to the program by or on behalf of a jurisdictional authority that has jurisdiction to authorize use of the game in a location in which the game is installed.

64. The method as claimed in claim 61, wherein one of the digital signatures is applied to the program by or on behalf of a casino in which the electronic gaming machine is installed.

65. The method as claimed in claim 61, wherein the signature verification means stores one or more public signature keys in secure storage and uses a public signature key from the secure storage to verify the digital signature associated with the program.

66. The method as claimed in claim 65, wherein the signature verification means includes signature revocation means for removing public signature keys from a set of valid keys as a method of revoking signature keys.

67. The method as claimed in claim 66, wherein the signature revocation means is activated by a password such that when the password is entered it allows a particular public signature stored in the verification means to be changed or deleted.

68. The method as claimed in claim 66, wherein a digital revocation certificate can be used, which must be validated by the validation means before it causes a public signature key to be revoked.

69. The method as claimed in claim 66, wherein revocation is time based, whereby the machine stores a set of public signature keys, which are valid for a fixed period of time, after which they are automatically revoked.

70. The method as claimed in claim 69, wherein the fixed period before automatic revocation is a period of 10 years.

71. The method as claimed in claim 69, wherein identification of a current active public signature is based upon comparison of a time stamp embedded in the signature with a time and date obtained from a current time value from a system clock.

72. The method as claimed in any one of claims 65, wherein a plurality of equivalent signatures are provided in the secure storage, such that any one of the equivalent signatures can be used as part of the verification.

73. The method as claimed in claim 72, wherein each of the equivalent signatures is identifiable as being associated with a person or entity responsible for issuing or authorizing the program.

74. The method as claimed in any one of claims 60, wherein the verification program records versions of a program that have been verified and will not re-verify versions earlier than the latest version that it has already verified.

75. The method as claimed in claim 74, wherein the record of verified program versions is stored in a secure log and entries in the record are unforgable and unalterable after being written.

76. The method as claimed in claim 75, wherein a record of digital signature key updates is kept in the secure log.

77. The method as claimed in claim 75, wherein the secure log is recorded in a tamper proof device.

78. The method as claimed in claim 77, wherein the tamper proof device is a smartcard or contains a smartcard chip.

* * * * *